(No Model.) 2 Sheets—Sheet 2.
E. A. SPERRY.
ELECTRIC LOCOMOTIVE.
No. 470,516. Patented Mar. 8, 1892.
Fig., 3.
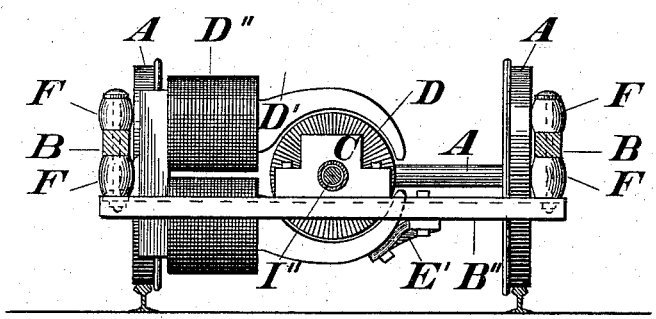
Fig., 4.
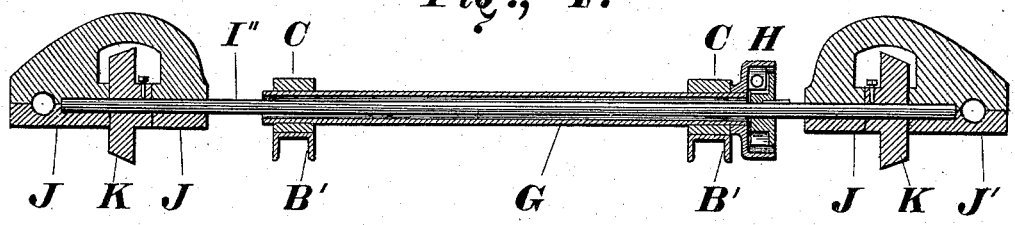
Fig., 5.
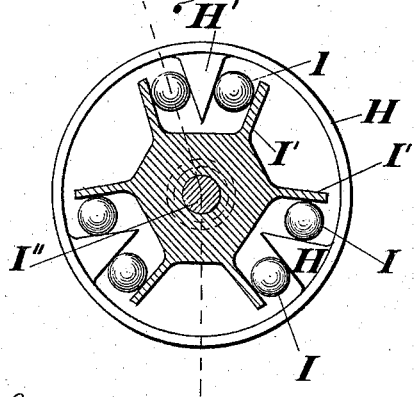
Fig., 6.
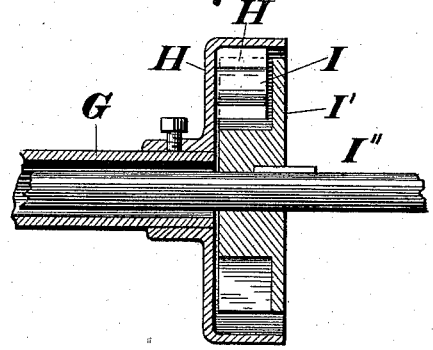
Witnesses:
Wm M. Rheem
Wm D. Ball
Inventor
Elmer A. Sperry

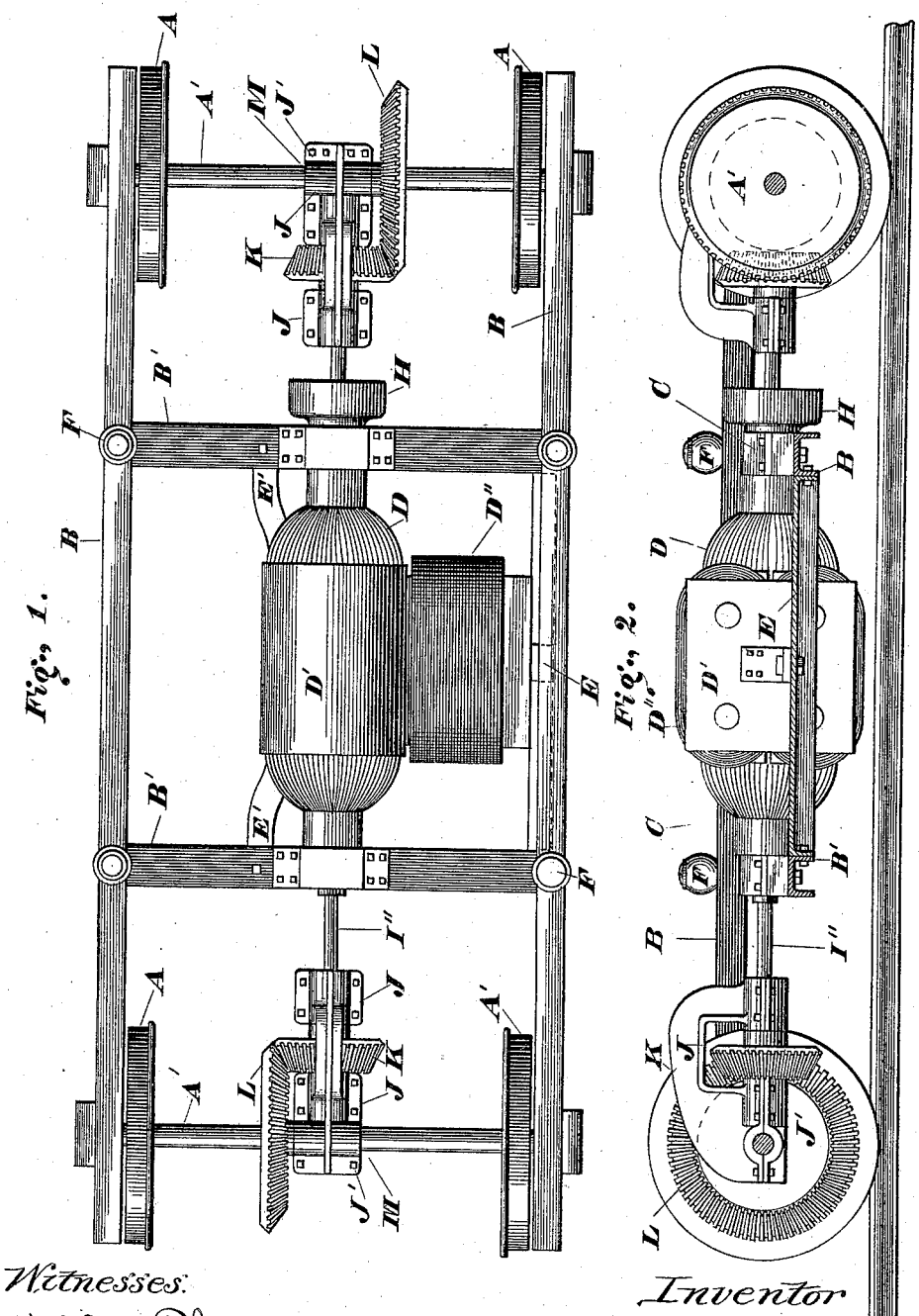

UNITED STATES PATENT OFFICE.

ELMER A. SPERRY, OF CHICAGO, ILLINOIS.

ELECTRIC LOCOMOTIVE.

SPECIFICATION forming part of Letters Patent No. 470,516, dated March 8, 1892.

Application filed June 11, 1891. Serial No, 395,856. (No model.)

*To all whom it may concern:*

Be it known that I, ELMER A. SPERRY, a citizen of the United States, residing at Chicago, in the county of Cook and State of Illinois, have invented a new and useful System of Power-Distribution for Vehicles or Cars, of which the following is a full, clear, and exact specification.

My invention relates to a system of power-distribution for vehicles or cars; and it relates to the mounting of the motor and of certain power connections between such motor and the traction wheel or wheels of the motor-truck.

The invention is illustrated as connected to a truck provided with two biwheeled axles, which are tortionally connected by an auxiliary shaft. One or more of these trucks may be used under a car or vehicle. If two, then the trucks would preferably be pivotal.

It also consists in certain details of the power connection between the motor and an auxiliary shaft, whereby the motor may be elastically supported to avoid destructive effects of concussion upon the insulated wires as the truck passes along an uneven track or surface; and other features are also hereinafter referred to, described, and shown in the drawings, in which—

Figure 1 represents a plan view of the truck-gearing and motor. Fig. 2 represents a side elevation of the same with parts thereof removed. Fig. 3 shows a transverse section. Figs. 4, 5, and 6 are details of construction.

Like letters of reference indicate similar parts throughout the views.

A A A A are traction-wheels mounted upon the axles A'.

B B is a side girder of the truck, resting upon suitable journal-bearings upon the extremities of the axles A' in the usual manner.

B' B' are transverse motor-supporting girders.

C C are journals supporting the axle of the revolving part of the motor, which in this case is the armature D.

D' is the field-magnet, surrounded by wire in the usual manner, (shown at D".) The whole is supported by the girders B', an arm E, which fastens onto the rear of the motor, (shown in Figs. 1 and 2,) and arms E' (shown in Figs. 1 and 3) connecting the pole-pieces of the motor to the transverse girders B'.

F F indicate an elastic connection between the transverse girder B' and the main girder of the truck B.

The hollow axle G of the armature (shown without the other parts mounted thereon in Fig. 4) is shown supporting at its extremity a flange H, which is rigidly secured thereto and has formed within it projections, as H', against the sides of which are elastic cushions I, which are shown in Fig. 5 as of spherical shape. In Fig. 6, however, they are shown as of cylindrical shape. On the opposite side of these cushions is provided an arm I', extending out from a shaft I". (Shown in all the figures.) This shaft passes through the hollow armature-shaft G at some distance therefrom, so that the two will not readily come in contact with each other, and is supported near its extremities by the bearings J J J J, which are in turn journaled upon the axles A' of the truck. At or near these points the shaft I" is provided with driving connection to the traction-wheels A, consisting in a pinion K and gear L.

M M indicate collars fastened upon the axles A to provide against the lateral thrust during the transmission of power between them.

The use and operation of my invention will be readily seen from the foregoing and may be briefly stated as follows: The motor as generally constructed consisting largely of cotton-covered copper wire, shocks and jars are found to cause abrasion of the cotton insulation, and to avoid such abrasion I prefer to mount the motor elastically, so that the vibration of the parts in passing over a rough track is not transmitted to the motor. This is accomplished by elastic supports. (Shown in the drawings by the rubber cushions F.) The power-transmitting gearing designed to transmit the power from the motor to the traction-wheels is shown to be such as would partake of the vibrations of the motor, and consists in the gears K and L and auxiliary shaft I" connecting, upon which are mounted the two pinions K, the whole being supported from the axles. This latter feature, however, is not essential, as it may receive its support from the truck; but owing to the fact that the rigid alignment should be maintained between the axle A′ and auxiliary shaft I″ it will be found of necessity to partake of the vibration of the truck to a greater or less degree. This would be true if only one axle or wheel was connected to such auxiliary shaft. To prevent this vibration which reaches the auxiliary shaft I″ being transmitted within the motor and still permit of the two axles being substantially coinstant as to their axes, I perforate the armature-shaft G with a much larger perforation than the exterior diameter of the shaft I″, allowing of a quite large lateral movement of the shaft I″ without coming in contact with the interior bore of the shaft G. At the end of the shaft G is the flange bearing the balls or rollers I, which are preferably made from some elastic substance. It will be readily understood that whenever the two shafts rotate eccentric to each other these rollers or balls will roll back and forth upon the surfaces of the projections I′ and H′, respectively, allowing thereby the free movement of either with reference to the other and still maintaining the proper power-driving connection between the two.

Although it is designed to use all these features in connection with one another, yet it is obvious that one or more of them may be used without the others and the invention extend to such use. It will also be obvious that the motor might be connected directly to the car-body, which in this case should be mounted upon springs or with springs between it and the axles A′, or the elastic support of the motor might be placed directly beneath its journals or between the transverse girder B′ and the various supporting arms or projections of the motor without departing from the spirit of the invention, which extends to the use when thus arranged.

I claim as new and desire to secure by Letters Patent—

1. In a power-gearing for electric cars, an electric motor, a hollow armature-shaft for said motor, a power-transmitting shaft within the armature-shaft connected by gearing to the car-axle, an elastic or cushion connection between the two shafts, and a rigid frame for the motor elastically supported from the truck-frame, whereby the motor may be located between the axles and permitted to vibrate independently of such axles.

2. In a power-gearing for cars, two traction-wheels, power-transmitting gearing from each of such traction-wheels to one and the same auxiliary shaft, a driving-motor mounted elastically upon the truck, the revolving part of which is provided with a hollow axle surrounding the auxiliary shaft, and driving connections from the motor to the shaft.

3. In a power-gearing for cars, a truck provided with two biwheeled axles, a shaft journaled within the truck, provided with power-transmitting connections to each of the two axles, a driving-motor mounted elastically upon the truck, the revolving part of which is provided with a hollow axle surrounding the auxiliary shaft, and driving connections from the motor to the shaft.

4. In a power-gearing for cars, a truck provided with two biwheeled axles, a shaft provided with journal-bearings, which are supported directly by journals upon said two axles, provided with power-transmitting connections to each of the two axles, a driving-motor mounted elastically upon the truck, the revolving part of which is provided with a hollow axle surrounding the auxiliary shaft, and driving connections from the motor to the shaft.

5. In a power-gearing for cars, a truck provided with two biwheeled axles, a shaft provided with journal-bearings, which are supported directly upon said two axles, provided with power-transmitting connections to each of the two axles, consisting of a tooth-gear and pinion, a driving-motor mounted elastically upon the truck, the revolving part of which is provided with a hollow axle surrounding the auxiliary shaft, and driving connections from the motor to the shaft.

6. In a power-gearing for cars, a shaft, power-transmitting gearing from traction-wheels of the truck to the shaft, rigid supports within the truck for same, a driving-motor the revolving part of which is provided with a hollow axle surrounding such shaft at a distance therefrom, projections from such hollow axle and co-operating projections from the shaft, and a rolling cushion inserted between such projections, constituting an elastic driving connection between the hollow axle and the shaft.

7. A motor-truck for a car, provided with biwheeled axles, an auxiliary shaft connected to one or more such axles by a power-transmitting driving connection, a rectangular truck-frame supported by the ends of the axles, a driving-motor mounted rigidly upon longitudinal pieces, which are in turn elastically supported to the truck-frame, the revolving part of which is provided with a hollow axle surrounding the auxiliary shaft, and driving connections from the motor to the shaft.

8. In a power-gearing for cars, the combination of the following elements: two axles, a gear-wheel upon one or more of the axles, a driving-shaft extending from one axle to the other, supports at or near its ends upon the axles, a pinion or pinions upon the shaft co-operating with the axle gear or gears, a motor, power connections from the motor to the shaft, and elastic supports for the motor to preserve the same from the shock and vibration of the axles.

9. In a power-gearing for cars, the combination of the following elements: two axles, bearings upon the axles, journal-boxes upon same for supporting the truck-frame, a car-body supported upon the journal-boxes, cross-beams supported from the truck-frame, a motor supported by the cross-beams, elastic cushions located between the motor and the truck-frame, power connections from one axle to the other, consisting in part of a shaft independent of the motor, and driving connections from the motor to the shaft.

10. In a power-gearing for cars, a biaxled truck, a motor mounted elastically between the axles, a pinion and pinion-shaft, a journal-bracket for same independent of the motor or its mountings mounted upon one of the car-axles, means also independent of the motor or its mountings for preserving the alignment of the bracket, and power connections from the motor to one or both axles of the truck.

ELMER A. SPERRY.

Witnesses:
W. D. BALL,
M. NIELSON.